United States Patent
Lobo et al.

(10) Patent No.: US 10,725,517 B2
(45) Date of Patent: Jul. 28, 2020

(54) DISTRIBUTED ON CHIP NETWORK TO MITIGATE VOLTAGE DROOPS

(71) Applicant: INTERNATIONAL BUSINESS MACHINES CORPORATION, Armonk, NY (US)

(72) Inventors: Preetham M. Lobo, Bangalore (IN); Thomas Strach, Wildberg (DE); Tobias Webel, Schwaebisch-Gmuend (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/595,549

(22) Filed: Oct. 8, 2019

(65) Prior Publication Data

US 2020/0033927 A1 Jan. 30, 2020

Related U.S. Application Data

(63) Continuation of application No. 15/356,804, filed on Nov. 21, 2016, now Pat. No. 10,481,662.

(30) Foreign Application Priority Data

Sep. 27, 2016 (GB) .................................. 1616341.2

(51) Int. Cl.
*G06F 1/28* (2006.01)
*G06F 1/324* (2019.01)
*G06F 1/3206* (2019.01)
*G06F 1/26* (2006.01)

(52) U.S. Cl.
CPC ................ *G06F 1/28* (2013.01); *G06F 1/266* (2013.01); *G06F 1/324* (2013.01); *G06F 1/3206* (2013.01); *Y02D 10/126* (2018.01)

(58) Field of Classification Search
None
See application file for complete search history.

(56) References Cited

U.S. PATENT DOCUMENTS

| | | | |
|---|---|---|---|
| 7,720,621 B2 | 5/2010 | Weekly | |
| 7,937,563 B2 | 5/2011 | Naffziger | |
| 9,141,421 B2 | 9/2015 | Eisen et al. | |
| 9,606,602 B2 | 3/2017 | Suryanarayanan | |
| 2014/0181537 A1 | 6/2014 | Manne | |
| 2015/0089198 A1 | 3/2015 | Sommers et al. | |

(Continued)

OTHER PUBLICATIONS

Bertran, Ramon et al., "Voltage Noise in Multi-Core Processors: Empirical Characterization and Optimization Opportunities," Proceedings of the 47th Annual IEEE/ACM International Symposium on Microarchitecture, Dec. 13, 2014, pp. 368-380.

(Continued)

*Primary Examiner* — Roy Y Yi
(74) *Attorney, Agent, or Firm* — Margaret McNamara, Esq.; Kevin P. Radigan, Esq.; Heslin Rothenberg Farley & Mesiti, P.C.

(57) ABSTRACT

A semiconductor circuit including a first subcircuit, at least a second subcircuit, and power management circuitry. The power management circuitry is operable for estimating a metric indicative of a momentary supply voltage present at the first subcircuit based on a power supply current of the first subcircuit and a cross current flowing between the first subcircuit and the second subcircuit.

20 Claims, 3 Drawing Sheets

(56) References Cited

U.S. PATENT DOCUMENTS

2015/0378412 A1 12/2015 Suryanarayanan et al.
2016/0098070 A1 4/2016 Curran et al.
2018/0088650 A1 3/2018 Lobo et al.

OTHER PUBLICATIONS

Floyd, Michael et al., "Voltage Droop Reduction Using Throttling Controlled by Timing Margin Feedback," 2012 Symposium on VLSI Circuits, Jun. 13, 2012, pp. 96-97.
Lefurgy, C. R., et al., "Active Management of Timing Guardband to Save Energy in POWER7," 2011 44$^{th}$ Annual IEEE/ACM International Symposium on Microarchitecture (MICRO), Porto Alegre, Dec. 2011, pp. 1-11.

DISTRIBUTED ON CHIP NETWORK TO MITIGATE VOLTAGE DROOPS

This application is a continuation of co-pending U.S. patent application Ser. No. 15/356,804, filed Nov. 21, 2016, entitled "DISTRIBUTED ON CHIP NETWORK TO MITIGATE VOLTAGE DROOPS," which claims priority from United Kingdom patent application number 1616341.2 filed Sep. 27, 2016, each of which is hereby incorporated herein by reference in its entirety.

BACKGROUND

One or more aspects relate to a semiconductor circuit, and in particular to, managing power of a semiconductor circuit.

In a processor, there is circuit switching activity at each clock cycle which results in noise on the common supply rail—this is also referred to as power grid noise. A sudden local increase in switching activity will induce a local droop in the supply voltage to the common supply rail of the power distribution network. This local droop then propagates over the chip area and affects the supply voltage in other regions.

However, supply voltage may only fluctuate within a certain margin to ensure proper functioning of the semiconductor circuit.

SUMMARY

In one embodiment, a semiconductor circuit is provided that includes a first subcircuit, at least one second subcircuit and power management circuitry. The power management circuitry is operable for estimating a metric indicative of a momentary supply voltage present at the first subcircuit based on a power supply current of the first subcircuit and a cross current flowing between the first subcircuit and the at least one second subcircuit.

BRIEF DESCRIPTION OF THE DRAWINGS

In one or more aspects.

DETAILED DESCRIPTION

In accordance with one or more aspects, a semiconductor circuit and a method for allowing reduced voltage droops are provided.

Figure 1:
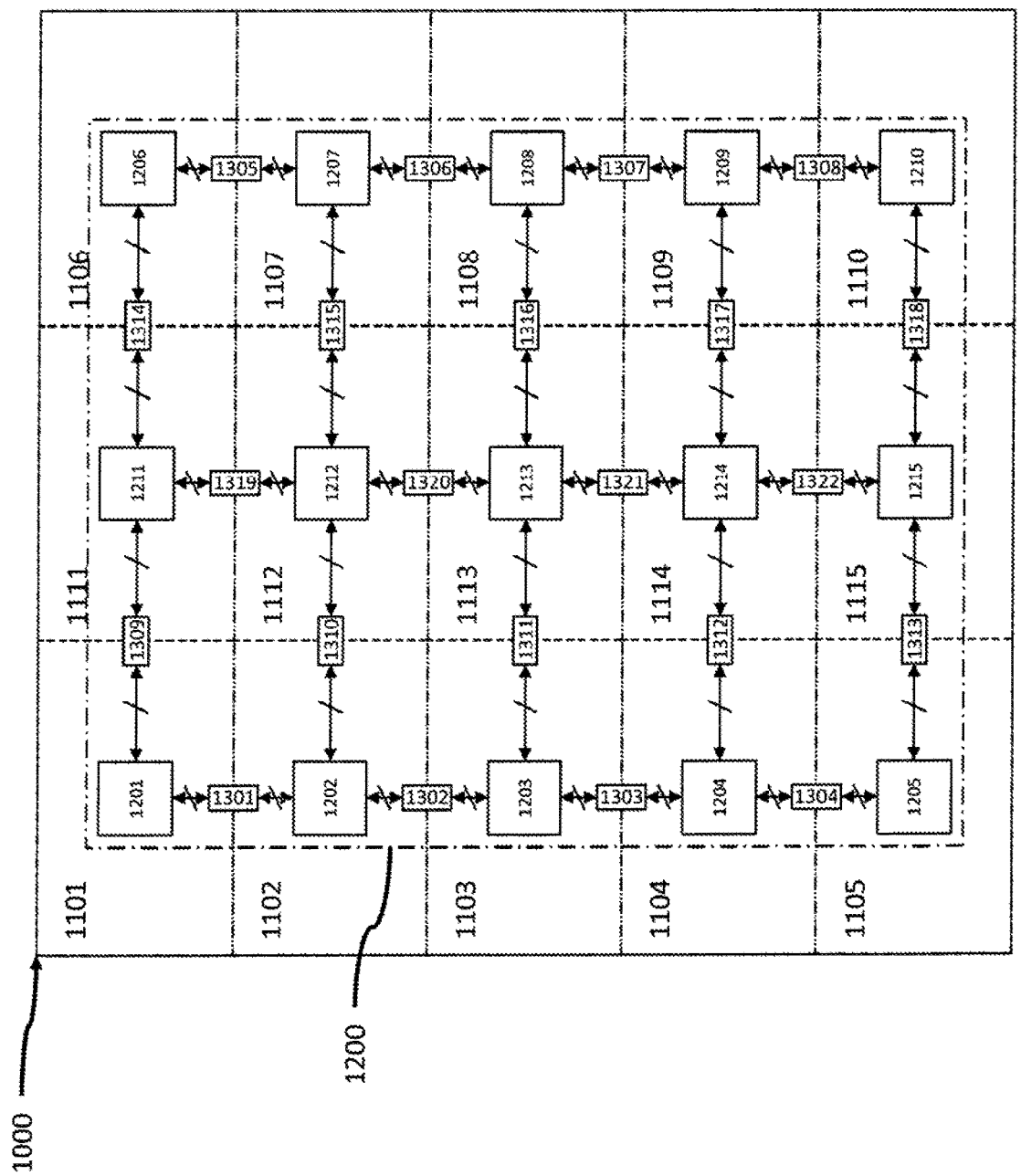
FIG. 1 shows a semiconductor circuit, in accordance with one or more aspects of the present invention.

FIG. 1 shows one example of a semiconductor circuit 1000 including several subcircuits 1101 to 1115. The semiconductor circuit may be a computer processor chip and the subcircuits 1101 to 1110 may correspond to the processor cores of the computer processor chip and the subcircuits 1111 to 1115 may correspond to caches of the computer processor chip to allow for an exchange of data between the different processor cores.

The subcircuits 1101 to 1115 may be provided with a common power supply in form of a power grid provided above the subcircuits. During operation, the power consumption of the subcircuits 1101 to 1115 may fluctuate. For example, the subcircuit 1105 may include a pipeline of a processing unit, in which at least one part of the pipeline includes at least one of an arithmetic unit, a load/store unit, a cache access unit, an instruction sequencing unit and an instruction decode unit. At a certain point in time, the pipeline may perform many switching operations. Accordingly, the power supply current of the subcircuit 1105 may be very high. At the same time, the subcircuits 1104 and 1115 may be in an idle state and experience a very low power supply current. This may imply a cross current from the subcircuits 1104 and 1115 to the subcircuit 1105. A high power supply current of the subcircuit 1103 which is not totally compensated by cross currents from the neighboring subcircuits 1102 and 1104 may translate in a local voltage droop at the subcircuit 1105 of the supply voltage. Furthermore, the cross current from the subcircuits 1102 and 1104 may induce voltage droops at the subcircuits 1102 and 1104 even if the subcircuits 1102 and 1104 are in an idle state.

Accordingly, the semiconductor circuit 1000 further includes power management circuitry 1200. The power management circuitry 1200 is operable for estimating a metric indicative of a momentary supply voltage present at the first subcircuit 1105 based on a power supply current of the subcircuit 1105 and a cross current flowing between the subcircuit 1105 and the subcircuits 1104 and 1115. The power management circuitry 1200 may derive the metric without actually measuring the power supply current of the subcircuit 1105, but based on activity indicators related to at least one part of the pipeline. Moreover, the power management circuitry 1200 may estimate the cross current based on current increments calculated from the metric.

A shown in FIG. 1, the power management circuitry 1200 may include a grid (or network) of power management units 1201 to 1215. Each power management unit 1201 to 1215 is assigned to one of the subcircuits 1101 to 1115 and configured for estimating the metric related to this specific subcircuit 1101 to 1115. Further, the power management units 1201 to 1215 may be adapted for throttling the subcircuit 1101 to 1115 based on the metric. For example, if the metric is indicative of a very low local supply voltage at the subcircuit 1105, the operation frequency of the subcircuit 1105 may be divided in half, to ensure proper functioning of the semiconductor circuit.

The power management units 1201 to 1215 are connected to one another with connecting units 1301 to 1322. The connecting unit may allow for exchanging data between the power management units 1201 to 1215 relating to the cross current between the associated subcircuits. The bit width of the data connection between the power management units 1201, ..., 1215 and the connecting units 1301, ..., 1322 may be twenty bits. The twenty bits may include one parity bit, one sign bit and eight value bits for each direction.

Figure 2:
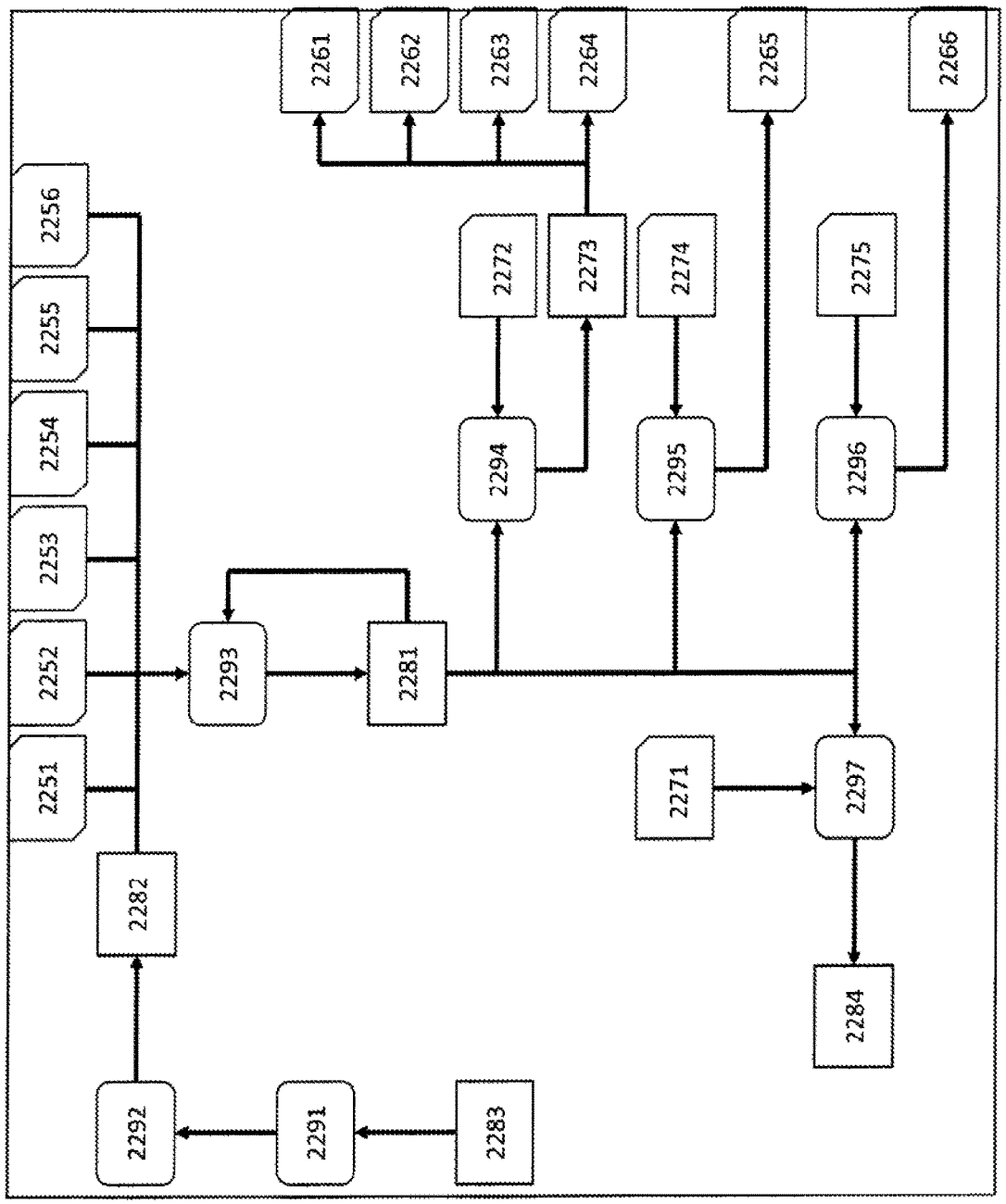
FIG. 2 shows a power management unit, in accordance with one or more aspects of the present invention.

FIG. 2 shows one example embodiment of a power management unit 2200, which may be used in power management circuitry 1200 according to FIG. 1. The power management unit 2200 includes, for instance, four current signal inputs 2251, 2252, 2253 and 2254 for receiving current signals indicative of a cross current from the subcircuit assigned to the power management unit 2200 to the immediately neighboring subcircuits and four increment current signal outputs 2261, 2262, 2263 and 2264 for transmitting increment current signals indicative of a change of the cross current from the neighboring subcircuit to the subcircuit assigned to the power management unit 2200. The number of current signal inputs and increment current signal outputs may differ according to the number of neighboring subcircuits. For example, the power management unit 1205 shown in FIG. 1 may only include two current signal inputs and two increment current signal outputs.

Further, the power management unit 2200 may include a current signal input 2255 and a current signal input 2256 for receiving a current signal indicative of a current from the subcircuit to ground and a signal indicative of a current to an external charge. Correspondingly, the power management unit 2200 may also include increment current outputs 2265 and 2266 for transmitting increment current signals indicative of a change of the current to ground and the current to the external charge, respectively.

The current signal inputs 2251, ..., 2256 may be adapted for receiving a 9 bit signal comprising one sign bit and 8 magnitude bits and the increment current signal outputs 2261, ..., 2266 may be adapted for transmitting a 9 bit signal comprising one sign bit, 6 magnitude bits and 2 fractional bits.

The power management unit 2200 further includes a metric register 2281 for storing the metric indicative of a momentary supply voltage present at the assigned subcircuit. The metric may also be considered as an indication of the charge accumulated by the assigned subcircuit. Moreover, the power management unit 2200 includes a self current register 2282. The self current register 2282 may store a number indicative of the power supply current of the assigned subcircuit. The number may, for example, be stored as an unsigned number with 7 magnitude bits.

In addition, the power management unit 2200 may include circuitry to determine the number indicative of the power supply current of the assigned subcircuit. In particular, this circuitry may include a core event register 2283, a weighting unit 2291 and a summing unit 2292, in which the weighting unit receives core events from the core event register 2283 and transmits weighted core events to the summing unit, and where the summing unit transmits the sum of the weighted core events to the self current register 2282.

As an example, one core event may be an arithmetic operation and another core event may be a cache access. Experience may show that the arithmetic operation involves a higher switching activity and a higher self current than the cache access. Accordingly, a higher weight may be attributed to the core event "arithmetic operation" resulting in a higher number stored in the self current register indicative of this higher self current.

The power management unit 2200 further includes an adding unit 2293. The adding unit 2293 receives a self current signal from the self current register 2282, the current signal from the current signal inputs 2251, ..., 2256 and the metric from the metric register 2281. The received signals are added and transmitted to the metric register 2281. The metric register 2281 may be a register adapted for storing a number with one sign bit and 16 magnitude bits.

In the embodiment shown in FIG. 2, the power management unit 2200 includes an increment current register 2273, an increment current coefficient register 2272, an increment current coefficient register 2274 and an increment current coefficient register 2275. The increment current coefficient registers 2272, 2274 and 2275 may be adapted for storing a coefficient indicative of the increment current induced by a certain value of the metric. The increment current coefficient registers 2272, 2274 and 2275 may be adapted to store a number consisting of 12 fractional bits. The power management unit 2200 also includes, e.g., multiplying units 2294, 2295 and 2296 receiving the metric from the metric register 2281 and increment current coefficients from the increment current coefficient registers 2272, 2274 and 2275, respectively.

The multiplying units 2295 and 2296 directly transmit the product thereof to the increment current signal outputs 2265 and 2266. The multiplying unit 2294 transmits the product to the increment current register 2273. The increment current register may be configured to store a number consisting of one sign bit, 6 magnitude bits and 2 fractional bits. The increment current signal outputs 2261, ..., 2264 may receive the increment current signal from the increment current register 2273.

Finally, in one example, the power management unit 2200 includes a throttle threshold register 2271, a comparing unit 2297 and an alarm register 2284. The comparing unit 2297 receives the metric from the metric register 2281 and a throttle threshold from the throttle threshold register 2271, and transmits an alarm signal to the alarm register 2284, in case the metric is greater than the throttle threshold. The alarm register 2284 may be read by the subcircuit to initiate throttling of the subcircuit.

The registers 2283, 2282, 2281, 2284, 2273 may be updated every clock cycle. The registers 2271, 2272, 2274 and 2275 are typically not updated during operation of the semiconductor circuit, but written only once after production of the semiconductor circuit.

Figure 3:
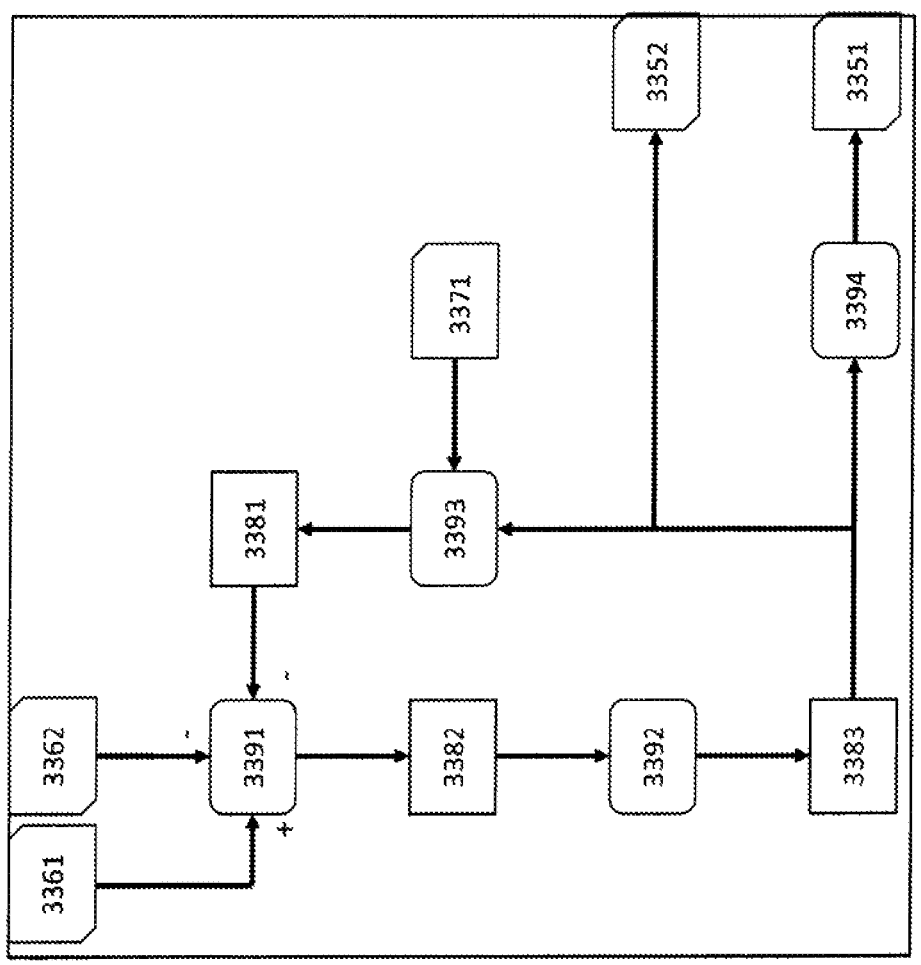
FIG. 3 shows a connecting unit, in accordance with one or more aspects of the present invention.

FIG. 3 shows one example embodiment of a connecting unit 3300, which may be used as a connection unit 1301, ..., 1322 of FIG. 1. The connecting unit 3300 includes a first increment current signal input 3361 for receiving a first increment current signal from a first power management unit and a second increment current signal input 3362 for receiving a second increment current signal from a second power management unit. Further, the connecting unit 3300 includes a first current signal output 3351 for transmitting a first current signal indicative of a cross current from the first subcircuit 1101 to the second subcircuit 1102 to the first power management unit 1201, and a second current signal input 3352 for transmitting a second current signal to the second power management unit 1202, where the second current signal corresponds to the inverted first current signal. The connecting unit 3300 is operable to determine the first current signal based on the first increment signal and the second increment signal.

The connecting unit includes, e.g., a connecting unit coefficient register 3371, an increment current sum register 3382, a cross current register 3383, a correction increment current register 3381, a summing unit 3391, and adding unit 3392, a multiplying unit 3393 and an inverting unit 3394. The summing unit 3391 receives the first increment current signal from the first increment current signal input 3361, the second increment current signal from the second increment current signal input 3362, and a correction increment current signal from the correction increment current register 3381. The summing unit 3391 transmits the first increment current signal minus the second increment current signal minus the correction increment current signal to the increment current sum register 3382. The adding unit 3392 receives an increment current sum signal from the increment current sum register 3382 and a cross current signal from the cross current register 3383 and transmits the sum of the increment current sum signal and the cross current signal to the cross current register 3383. The multiplying unit 3393 receives the cross current signal from the cross current register 3383 and a connection unit coefficient from the connection unit coefficient register 3371 and transmits the product of the cross current signal and the connection unit coefficient to the correction increment current register 3381. The inverting unit 3394 receives the cross current signal from the cross current register 3383 and transmits the negative cross current signal to the first current signal output 3351. The second current signal output 3352 receives the cross current signal from the cross current register 3383.

As described herein, in one embodiment, a semiconductor circuit is provided that includes a first subcircuit, at least a second subcircuit and power management circuitry. The power management circuitry is operable for estimating a metric indicative of a momentary supply voltage present at the first subcircuit based on a power supply current of the first subcircuit and a cross current flowing between the first subcircuit and the second subcircuit.

In one embodiment of the semiconductor circuit, the first subcircuit includes a pipeline of a processing unit and the power management circuitry is operable for estimating the power supply current of the first subcircuit based on activity indicators related to at least one part of the pipeline.

In another embodiment of the semiconductor circuit, at least one part of the pipeline includes at least one of an arithmetic unit, a load/store unit, a cache access unit, an instruction sequencing unit, and an instruction decode unit.

Further, in an embodiment of the semiconductor circuit, the power management circuitry is operable for estimating the cross current based on current increments calculated from the metric.

Additionally, in an embodiment of the semiconductor circuit the estimating the metric is further based on at least one external supply current.

In another embodiment of the semiconductor circuit, the power management circuit includes a grid of power management units, in which each power management unit is assigned to one of the subcircuits, and wherein each power management unit is configured for estimating the metric related to this subcircuit.

Further, in an embodiment of the semiconductor circuit, each power management unit is configured for throttling the subcircuit based on the metric.

Additionally, in an embodiment of the semiconductor circuit, the power management circuitry includes at least one connecting unit, in which the connecting unit connects a first power management unit assigned to the first subcircuit to a second power management unit assigned to the second subcircuit.

In another embodiment of the semiconductor circuit, the power management unit includes a current signal input for receiving a first current signal indicative of a cross current from the second subcircuit to the first subcircuit, and an increment current signal output for transmitting a first increment current signal indicative of a change of the cross current from the second subcircuit to the first subcircuit.

Further, in an embodiment of the semiconductor circuit, the connecting unit includes a first increment current signal input for receiving the first increment current signal from the first power management unit, a second increment current signal input for receiving a second increment current signal from the second power management unit, a first current signal output for transmitting the first current signal indicative of the cross current from the second subcircuit to the first subcircuit to the first power management unit, a second current signal output for transmitting a second current signal to the second power management unit, wherein the second current signal corresponds to the inverted first current signal, wherein the connecting unit is operable to determine the first current signal based on the first increment signal and the second increment signal.

Additionally, in an embodiment of the semiconductor circuit, the connecting unit further includes a connecting unit coefficient register, an increment current sum register, a cross current register, a correction increment current register, a summing unit receiving the first increment current signal from the first increment current signal input, the second increment current signal from the second increment current signal input, and a correction increment current signal from the correction increment current register and transmitting the first increment current signal minus the second increment current signal minus the correction increment current signal to the increment current register, an adding unit receiving an increment current sum signal from the increment current sum register and a cross current signal from the cross current register and transmitting the sum of the increment current sum signal and the cross current signal to the cross current register, a multiplying unit receiving the cross current signal from the cross current register and a connection unit coefficient from the connection unit coefficient register and transmitting the product of the cross current signal and the connection unit coefficient to the correction increment current register, an inverting unit receiving the cross current signal from the cross current register and transmitting the negative cross current signal to the first current signal output, and where the second current signal output receives the cross current signal from the cross current register.

In another embodiment of the semiconductor circuit, the power management unit includes a metric register for storing the metric, a self current register, a current signal input, an adding unit that receives a self current signal from the self current register, the current signal from the current signal input and the metric from the metric register and transmits the sum of the self current signal and the metric to the metric register.

Further, in an embodiment of the semiconductor circuit, the power management unit includes a core event register, a weighting unit and a summing unit, in which the weighting unit receives core events from the core event register and transmits weighted core events to the summing unit, and where the summing unit transmits the sum of the weighted core events to the self current register.

Additionally, in an embodiment of the semiconductor circuit, the power management unit includes an increment current signal output, an increment current coefficient register and a multiplying unit receiving the metric from the metric register and transmitting the product to the increment current signal output.

According to another embodiment of the semiconductor circuit, the power management unit includes an increment current register, an increment current coefficient register and a multiplying unit receiving the metric from the metric register and transmitting the product of the metric and the increment current coefficient to the increment current register, in which the increment current signal output receives the increment current signal from the increment current register.

Further, in an embodiment of the semiconductor circuit, the power management unit includes a throttle threshold register, a comparing unit and an alarm register, and where the comparing unit receives the metric from the metric register and a throttle threshold from the throttle threshold register and transmits an alarm signal to the alarm register, in case the metric is greater than the throttle threshold.

Additionally, in an embodiment of the semiconductor circuit, the self current register and the metric register are updated every clock cycle.

According to another embodiment of the semiconductor circuit, the increment current sum register and the cross current register are updated at most every second clock cycle, e.g., at most every eighth clock cycle.

Further, in an embodiment of the semiconductor circuit, the increment current sum register and the cross current register are updated at least every 32th clock cycle, e.g., at least every 16th clock cycle, more particularly, e.g., at least every 8th clock cycle.

Further, a method for managing power of a semiconductor circuit is provided, in which the semiconductor circuit includes a first subcircuit and a second subcircuit, and where the method includes estimating the momentary supply voltage of the first subcircuit based on estimating the power supply current of the first subcircuit and estimating the cross current flowing between the first subcircuit and the second subcircuit.

According to one embodiment of the method, the first subcircuit includes a pipeline of a processing unit, and the power supply current of the first subcircuit is estimated based on activity indicators related to at least one part of the pipeline.

A further embodiment of the method includes throttling the first subcircuit based on the estimated momentary supply voltage of the first subcircuit.

In another embodiment of the method, the method further includes estimating the cross current based on current increments derived from the momentary supply voltage of the first subcircuit.

Further, an embodiment of the method further includes comprises estimating the momentary supply voltage of the first subcircuit based on an external supply current.

What is claimed is:

1. A semiconductor circuit comprising:
 a first subcircuit;
 at least one second subcircuit; and
 power management circuitry, wherein the power management circuitry is operable for estimating a metric indicative of a momentary supply voltage present at the first subcircuit based on a power supply current of the first subcircuit and a cross current flowing between the first subcircuit and the at least one second subcircuit, and wherein the power management circuitry comprises:
  a grid of power management units, a first power management unit of the grid of power management units being assigned to the first subcircuit, the first power management unit being configured to estimate the metric related to the first subcircuit; and
  the first power management unit comprises a current signal input to receive a current signal indicative of a cross current from a selected second subcircuit of the at least one second subcircuit to the first subcircuit.

2. The semiconductor circuit according to claim 1, wherein the first subcircuit comprises a pipeline of a processing unit and wherein the power management circuitry is operable for estimating the power supply current of the first subcircuit based on activity indicators related to at least one part of the pipeline.

3. The semiconductor circuit according to claim 2, wherein the at least one part of the pipeline includes at least one of an arithmetic unit, a load/store unit, a cache access unit, an instruction sequencing unit and an instruction decode unit.

4. The semiconductor circuit according to claim 1, wherein the power management circuitry is operable for estimating the cross current based on current increments calculated from the metric.

5. The semiconductor circuit according to claim 1, wherein estimating the metric is further based on at least one external supply current.

6. The semiconductor circuit according to claim 1, wherein the grid of power management units further comprises at least one second power management unit assigned to the at least one second subcircuit, each power management unit being configured to estimate the metric related to its assigned subcircuit.

7. The semiconductor circuit according to claim 6, wherein the power management unit is further configured to throttle the subcircuit based on the metric.

8. The semiconductor circuit according to claim 6, wherein the power management unit further comprises an increment current signal output to transmit an increment current signal indicative of a change of the cross current from the second selected subcircuit to the first subcircuit.

9. The semiconductor circuit according to claim 6, wherein the power management circuitry comprises at least one connecting unit, wherein a connecting unit of the at least one connecting unit connects the first power management unit assigned to the first subcircuit to the second power management unit assigned to a second subcircuit of the at least one second subcircuit.

10. The semiconductor circuit according to claim 9, wherein the connecting unit comprises:
 a first increment current signal input to receive a first increment current signal from the first power management unit;
 a second increment current signal input to receive a second increment current signal from the second power management unit;
 a first current signal output to transmit a first current signal indicative of a cross current from the first subcircuit to the second subcircuit to the first power management unit;
 a second current signal output to transmit a second current signal to the second power management unit, wherein the second current signal corresponds to an inverted first current signal; and
 wherein the connecting unit is operable to determine the first current signal based on the first increment current signal and the second increment current signal.

11. The semiconductor circuit according to claim 10, wherein the connecting unit further comprises:
 a connection unit coefficient register;
 an increment current sum register;
 a cross current register;
 a correction increment current register;
 a summing unit to receive the first increment current signal from the first increment current signal input, the second increment current signal from the second increment current signal input, and a correction increment current signal from the correction increment current register, and to transmit the first increment current signal minus the second increment current signal minus the correction increment current signal to the increment current sum register;
 an adding unit to receive an increment current sum signal from the increment current sum register and a cross current signal from the cross current register and to transmit a sum of the increment current sum signal and the cross current signal to the cross current register;
 a multiplying unit to receive the cross current signal from the cross current register and a connection unit coefficient from the connection unit coefficient register and to transmit a product of the cross current signal and the connection unit coefficient to the correction increment current register;

an inverting unit to receive the cross current signal from the cross current register and to transmit a negative cross current signal to the first current signal output; and wherein the second current signal output is to receive the cross current signal from the cross current register.

12. The semiconductor circuit according to claim 1, wherein the first power management unit comprises:
a metric register for storing the metric;
a self current register;
a current signal input; and
an adding unit, wherein the adding unit receives a self current signal from the self current register, a current signal from the current signal input and the metric from the metric register and transmits a sum of the self current signal, the current signal and the metric to the metric register.

13. The semiconductor circuit according to claim 12, wherein the first power management unit further comprises:
a core event register;
a weighting unit; and
a summing unit, wherein the weighting unit receives core events from the core event register and transmits weighted core events to the summing unit, and wherein the summing unit transmits a sum of the weighted core events to the self current register.

14. The semiconductor circuit according to claim 12, wherein the first power management unit further comprises:
an increment current signal output;
an increment current coefficient register; and
a multiplying unit to receive the metric from the metric register and an increment current coefficient from the increment current coefficient register and transmit a product of the metric and the increment current coefficient to the increment current signal output.

15. The semiconductor circuit according to 12, wherein the first power management unit comprises:
an increment current register;
an increment current coefficient register; and
a multiplying unit to receive the metric from the metric register and transmit a product of the metric and an increment current coefficient of the increment current coefficient register to the increment current register, and wherein an increment current signal output receives an increment current signal from the increment current register.

16. The semiconductor circuit according to claim 12, wherein the first power management unit further comprises:
a throttle threshold register;
a comparing unit; and
an alarm register, wherein the comparing unit receives the metric from the metric register and a throttle threshold from the throttle threshold register and transmits an alarm signal to the alarm register, based on the metric being greater than the throttle threshold.

17. A method of managing power of a semiconductor circuit, said method comprising:
providing power management circuitry to:
estimate a power supply current of a first subcircuit of a semiconductor circuit comprising the first subcircuit and a second subcircuit; and
estimate a momentary supply voltage of the first subcircuit, the estimating being based on the estimating the power supply current of the first subcircuit and estimating a cross current flowing between the first subcircuit and the second subcircuit, the power management circuitry comprising:
a grid of power management units, a first power management unit of the grid of power management units being assigned to the first subcircuit, the first power management unit being configured to estimate the metric related to the first subcircuit; and
the first power management unit comprises a current signal input to receive a current signal indicative of a cross current from a selected second subcircuit of the at least one second subcircuit to the first subcircuit.

18. The method according to claim 17, wherein the first subcircuit comprises a pipeline of a processing unit, and wherein the power supply current of the first subcircuit is estimated based on activity indicators related to at least one part of the pipeline.

19. The method according to claim 17, further comprising throttling the first subcircuit based on the estimated momentary supply voltage of the first subcircuit.

20. A method of managing power of a semiconductor circuit, said method comprising:
providing power management circuitry to:
estimate a power supply current of a first subcircuit of a semiconductor circuit comprising the first subcircuit and a second subcircuit,
estimate a momentary supply voltage of the first subcircuit, the estimating being based on the estimating the power supply current of the first subcircuit and estimating a cross current flowing between the first subcircuit and the second subcircuit, the power management circuitry comprising a grid of power management units, a power management unit of the grid of power management units being assigned to the first subcircuit, and
the power management circuitry being configured to:
estimate the cross current based on current increments derived from the momentary supply voltage of the first subcircuit, and estimate the momentary supply voltage of the first subcircuit based on an external supply current.

\* \* \* \* \*